United States Patent

Morron et al.

[11] Patent Number: 6,025,980
[45] Date of Patent: Feb. 15, 2000

[54] EARTH LEAKAGE PROTECTIVE RELAY

[75] Inventors: Ricardo Morron; David Moreno, both of Barcelona; Pere Planas, Terrassa, all of Spain

[73] Assignee: General Electric Company, Schenectady, N.Y.

[21] Appl. No.: 09/131,613

[22] Filed: Aug. 10, 1998

[51] Int. Cl.[7] ................................................ H02H 3/00
[52] U.S. Cl. ........................ 361/42; 361/45; 361/18; 361/23; 361/115
[58] Field of Search .............................. 361/42, 45, 93, 361/115, 118, 23, 24, 25, 18, 113

[56] References Cited

U.S. PATENT DOCUMENTS 4,417,202 11/1983 Pascoe ........................................ 324/51
5,245,498 9/1993 Uchida ........................................ 361/93

*Primary Examiner*—Stephen W. Jackson
*Attorney, Agent, or Firm*—Carl B. Horton; Cantor Colburn LLP

[57] ABSTRACT

An earth fault detection circuit employs a differential current transformer and burden resistor to sample circuit current for potential earth fault current. A second order low pass filter circuit is employed to filter out harmonics within the protected circuit and a time delay circuit is used to insure the occurrence of a true earth fault leakage condition. A circuit with an operational amplifier is used to create a symmetric power supply for the rest of the circuits from a full wave rectified AC source.

17 Claims, 4 Drawing Sheets

EARTH LEAKAGE PROTECTIVE RELAY

BACKGROUND OF THE INVENTION

Earth leakage also described as "ground fault" is often caused by an insulation defect causing circuit current to pass directly to ground. Differential current transformers and zero sequence current transformers are commonly used within the phases of a multi-phase electrical distribution surface to sum the current within each phase and to determine in the absence of zero current that there is unwarranted transport between one or more phases and the neutral phase which is electrically connected to ground.

An early example of a circuit breaker using a burden resistor connecting to the output of a differential transformer for earth fault detection is found in British Patent GB2109163 entitled "Earth Leakage Circuit Breaker for Electrical Installation Protection". A further example of a circuit breaker having earth fault protection is found in Russian Patent SU 1644279 entitled "Cable Network Earth Leakage Current Protection Device". This patent teaches the use of a capacitor filter circuit to eliminate so-called "nuisance tripping."

Recent attempts employing bandwidth filters to determine the occurrence of ground fault within residential circuits are found in U.S. Pat. No. 5,224,006 entitled "Electronic Circuit Breaker with Protection Against Sputtering Arc Faults and Ground Faults"; and U.S. patent entitled "Low Cost Apparatus for Detecting Arcing Faults and Circuit Breaker Incorporating Same".

When such filter circuits are used within 50 Hz electrical distribution circuits for first order low pass filters, the values of the resistors and capacitors are selected to allow the detector circuit to have a low sensitivity to harmonics, particularly the third harmonic. For 60 Hz electrical circuits, the values must be adjusted accordingly to provide the same degree of third harmonic attenuation.

It would be advantageous to determine earth leakage by use of a common filter circuit for both 50 Hz and 60 Hz with the same or higher degree of harmonic attenuation of the harmonics within the associated electrical circuit.

One purpose of the invention is to provide an earth leakage protection circuit for use with both circuit breakers and relays within both 50 Hz and 60 HZ electrical distribution circuits with the same or higher degree of harmonic attenuation of the harmonics within the associated electrical circuit, without substantial increase in circuit component cost.

SUMMARY OF THE INVENTION

An earth leakage detection circuit for circuit breakers and protective relays employs a differential current transformer and burden resistor to sample circuit current for potential earth fault current. A second order low pass filter circuit is employed to filter out harmonics within the protected circuit and a time delay circuit is used to insure the occurrence of a true earth fault leakage condition. The value of the earth leakage current is compared to a reference value and the circuit is interrupted if the reference value is exceeded beyond a predetermined time increment.

DESCRIPTION OF THE PREFERRED EMBODIMENT

Figure 1:
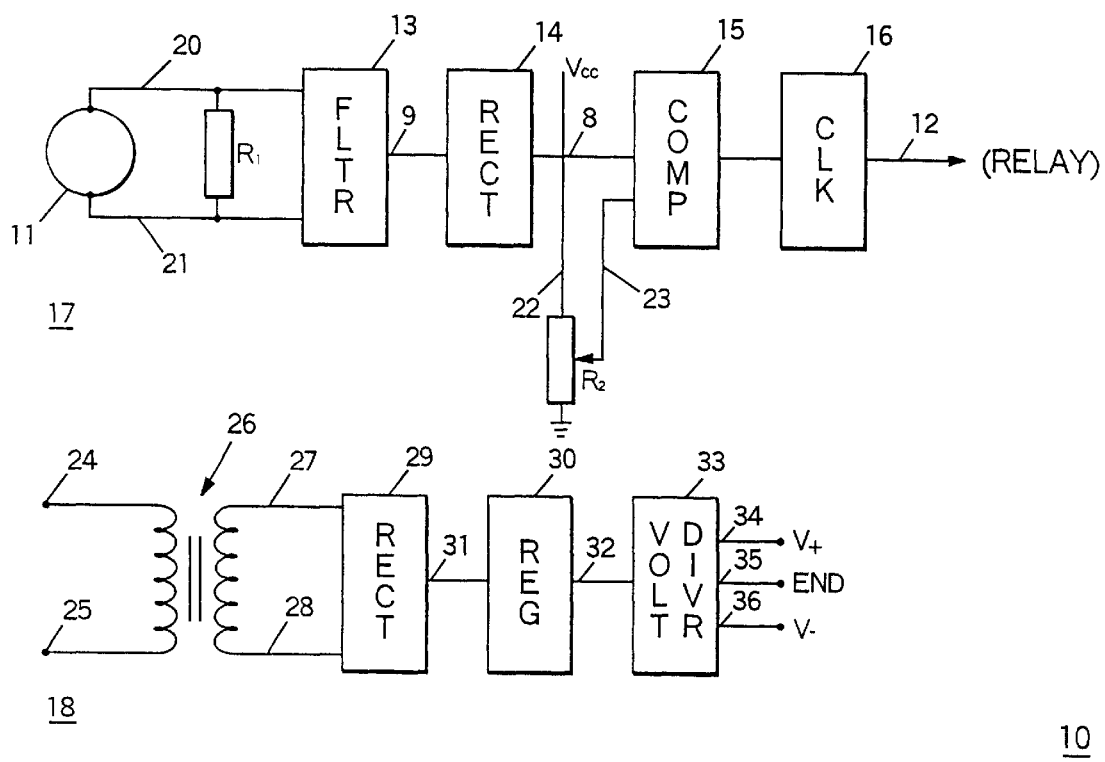
FIG. 1 is a diagrammatic representation of the earth fault relay according to the invention.

The earth leakage circuit detection circuit 10 of the invention shown in FIG. 1 includes a conditioning and logic circuit 17 in the form of a zero sequence current transformer 11 arranged for connection within each phase of multi-phase electrical distribution circuit to determine the presence of a nonzero resultant current sum therein. The resultant current is converted to an earth leakage voltage signal by means of the burden resistor $R_1$ and is filtered within a second order filter 13 which will be described in detail below to render the earth fault signal insensitive to harmonic components within the electrical system and to avoid nuisance tripping without sacrificing sensitivity to an actual earth fault occurrence. The term "second order" herein refers to the operation of a second order differential equation. The filter components are selected to provide a uniform gain in the range of 50 to 60 Hertz and a minimum attenuation of –10 dB at 150 Hertz (3rd harmonic of 50 Hz fundamental), –20 dB at 250 Hertz (5th harmonic of said fundamental) and –26 dB at 350 Hertz (7th harmonic of said fundamental).

The output value of the filter 13 is rectified within the rectifier 14 so the positive and negative values of the input signal are compared to a reference value set by means of the variable resistor $R_2$ which connects with a comparator circuit 15 by means of conductors 22, 23. The output of the comparator is fed to the switching transistor $Q_1$ (FIG. 6) of the protective relay or circuit breaker (not shown) to interrupt the protected circuit. Operating power to the earth leakage circuit detection circuit 10 is supplied by means of the power supply circuit which is connected to the protected circuit by means of the input terminals 24, 25 to the step-down potential transformer 26. The output voltage is connected with the full wave rectifier 29 over conductors 27, 28 and is inputted to the voltage regulator 30 by means of conductor 31 and the output of the voltage regulator is connected with an active voltage divider 33 by means of conductor 32 to provide the positive and negative regulated voltages to conductors 34, 36 and to provide ground connection over conductor 35.

Figure 2:
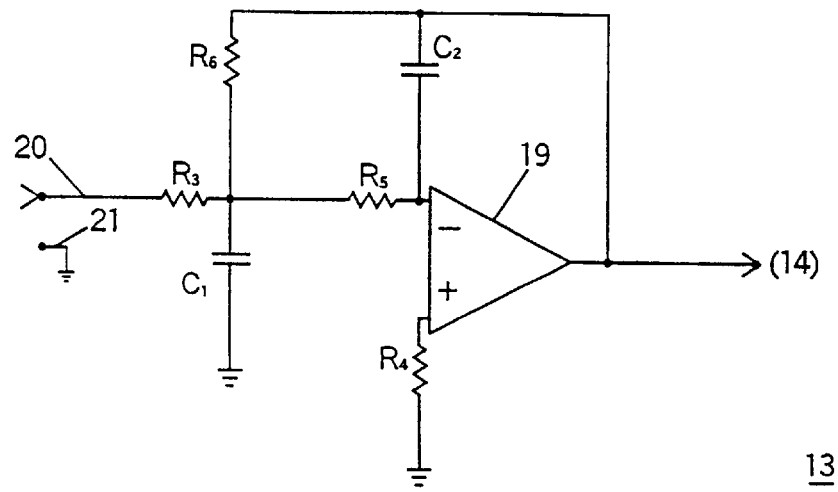
FIG. 2 is a diagrammatic representation of the filter circuit used within the earth fault relay of FIG. 1.

The second order filter 13 is shown in FIG. 2 to consist of RC circuits consisting of resistors $R_3 - R_6$ and capacitors $C_1$, $C_2$, that connect between conductors 20, 21 and the operational amplifier 19. The capacitance and resistance values are selected to provide an output signal G to the rectifier 14, of FIG. 1 having a transfer function in accordance with the following equation:

$$G(f) := \frac{1}{R3 \cdot R5}.$$

-continued $$\frac{1}{-(2\pi f)^2 \cdot C1 \cdot C2 + C2 \cdot \left(\frac{1}{R3} + \frac{1}{R5} + \frac{1}{R6}\right) \cdot j \cdot 2\pi f + \frac{1}{R5 \cdot R6}}$$

where the cut-off frequency is defined by $f_0 = 1/[2 \cdot \pi \cdot (R5.R6.C1.C2)^{1/2}]$ the damping factor $z = \frac{1}{2}.(1/R3 + 1/R5 + 1/R6).(R5.R6.C2/C1)^{1/2}$ The values of R3, R5, R6, C1 and C2 are selected such that the cut-off frequency fo is 80 Hz, the damping factor z is 0.5 and the DC gain G(0) is determined by the expression G(0)=R6/R3.

Figure 3:
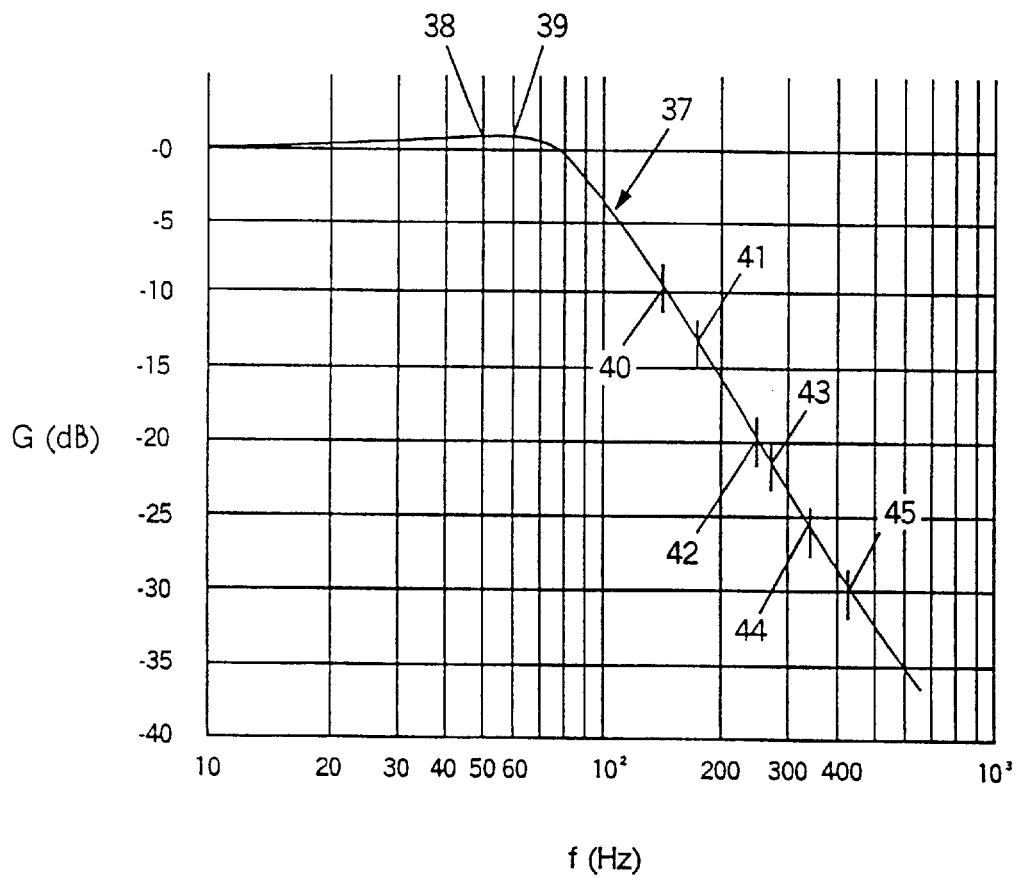
FIG. 3 is a graphic representation of the relationship between signal amplitude and signal frequency within the filter circuit of FIG. 2.

FIG. 3 depicts the relationship 37 between the DC gain in dB as a function of frequency. The gain at the 50 Hz and 60 Hz fundamental frequencies is depicted at 38, 39, the third harmonics at 40, 41, the fifth harmonics at 42, 43 and the seventh harmonics at 44, 45 respectively. The attenuation of the odd harmonics has been shown to eliminate the occurrence of nuisance trips in the absence of true earth leakage conditions.

Figure 4:
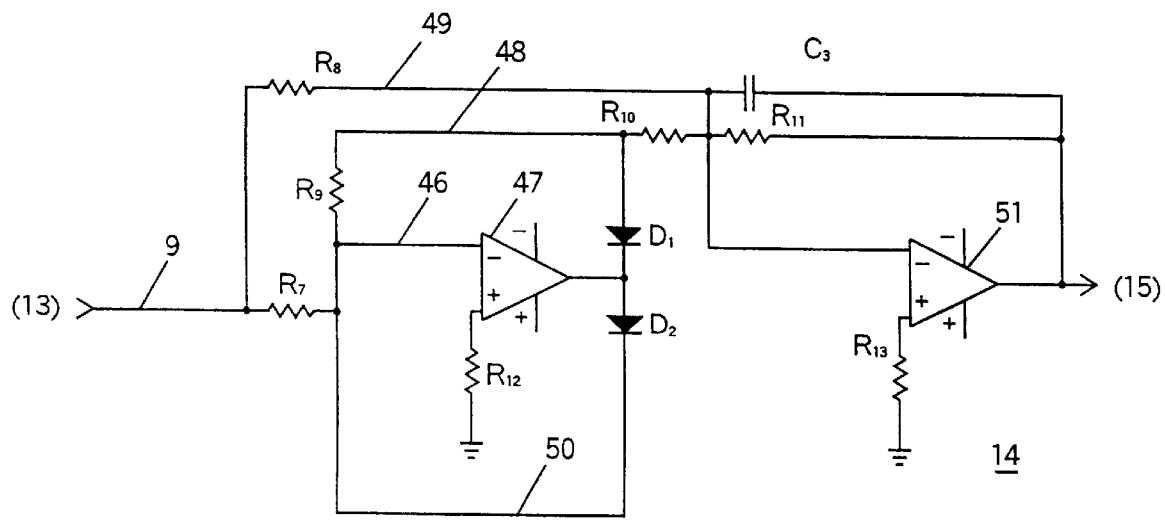
FIG. 4 is a diagrammatic representation of the rectifier circuit within the earth fault relay of FIG. 1.

The filtered signal is inputted to the ideal full wave rectifier 14 shown in FIG. 1 and depicted in detail in FIG. 4. The rectifier 14 receives the filtered signal from conductor 9 through resistor $R_7$ and conductor 46 to one input of a first operational amplifier 47, through conductor 48 and resistors $R_9$, $R_{10}$ to one input of a second operational amplifier 51 and to the output of the second operational amplifier via resistor $R_{11}$. The input to the first operational amplifier 47 connects through resistor R9 and diode $D_1$ to the output thereof and through diode $D_2$ and conductor 50 back to the input in feed-back relation. The other inputs to the operational amplifiers connect with ground through resistors $R_{12}$, $R_{13}$ as indicated. The filtered signal is connected with one input of the second operational amplifier 51 via conductor 49, resistor $R_8$ and with the output of the second operational amplifier through capacitor $C_3$ The values of the resistors are selected as follows: $R_7 = R_8 = R_9 = R_{11} = 2R_{10}$. Resistor $R_{11}$ and capacitor $C_3$ in the feedback path of the second operational amplifier 51 provide a time constant $(RC)_1$ in the range of 20 to 50 milliseconds to integrate the average value of the rectified voltage. The output signal of the second operational amplifier 51 is roughly proportional to the root mean square value of the earth fault current detected by the zero sequence current transformer 26 of FIG. 1 for all the waveform configuration requirements for type A earth leakage relays in accordance with ISO 947-2 standards.

Figure 5:
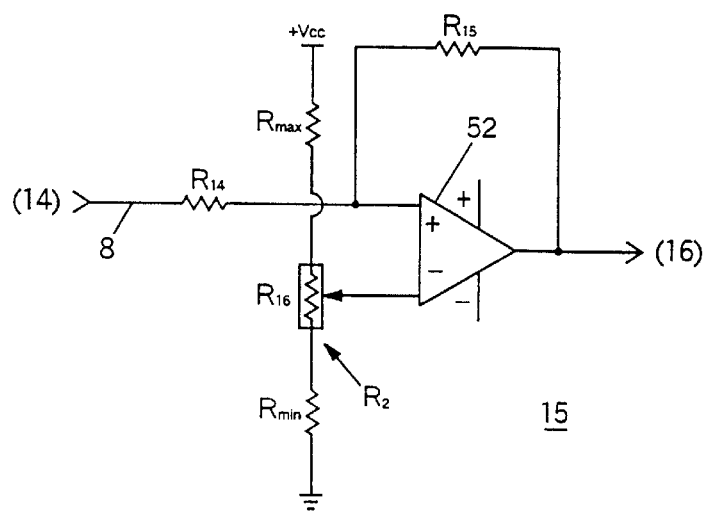
FIG. 5 is a diagrammatic representation of the comparator circuit within the earth fault relay of FIG. 1.

The output signal of the second operational amplifier 51 within the full wave rectifier 14 is applied to the inputs of the comparator circuit 15 shown in FIG. 1, and depicted in detail in FIG. 5. The output signal is received at one end of the resistor $R_{14}$ and is applied to the input of operational amplifier 52. The signal is compared with a threshold value set by the varialbe resistor $R_2$ configured as a comparator potentiometer that includes a variable resistor $R_{16}$ connecting with one input to the operational amplifier 52. The variable resistor $R_{16}$ connects with ground through resistor $R_{min}$ representing the minimum value of the threshold and with the voltage source Vcc through resistor $R_{max}$ representing the maximum value of the threshold that is directly related to the value of earth leakage current at which the associated protective relay (not shown) is set to trip. The voltage divider resistors $R_{max}$ and $R_{min}$ limit the maximum and minimum values of the threshold value and positive feedback is applied to the non-inverting input of the operational amplifier 52 through resistor $R_{,15}$ for providing two defined states at the operational amplifier output. When the input signal form the rectifier 14 exceeds the threshold value set by the variable resistor $R_2$, the output of the operational amplifier 52 turns on (logic 1) thereby allowing the associated relay to trip.

Figure 6:
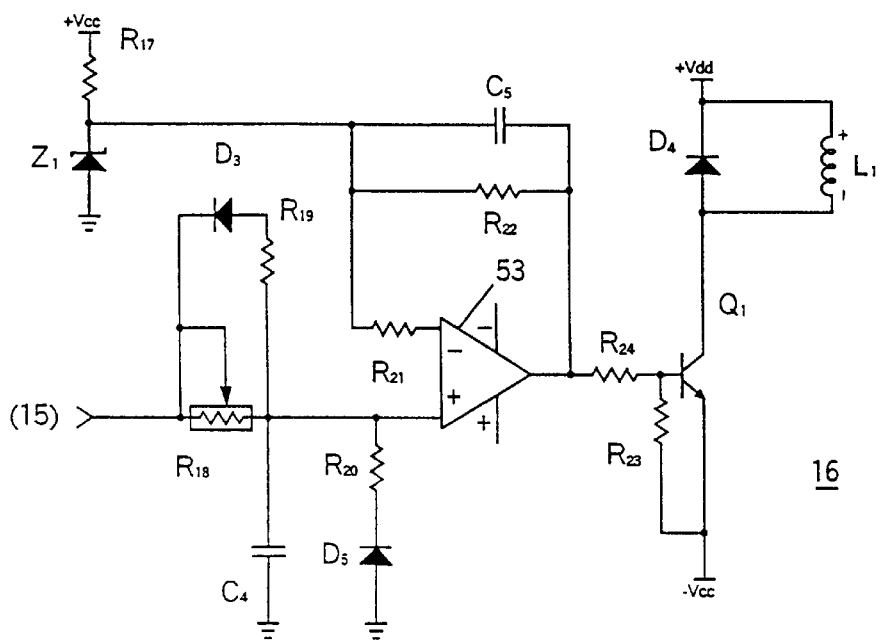
FIG. 6 is a diagrammatic representation of the timing circuit within the earth fault relay of FIG. 1.

The output of the operational amplifier 52 is applied to the timing circuit 16 shown in FIG. 1, and depicted in detail in FIG. 6. The voltage signal is received at one end of the variable resistor $R_{18}$ configured as a timing potentiometer and the adjusted signal is applied to one input of the operational amplifier 53. Capacitor $C_4$, resistor $R_{19}$ and diode $D_3$ are connected in feedback relation between ground and the input of the variable resistor. The one input to the operational amplifier 53 connects to ground via resistor $R_{20}$ and Diode $D_5$ while the other input to the operational amplifier 53 connects via resistor $R_{21}$ to the midpoint between the Zener Diode $Z_1$ and the current limiting resistor $R_{17}$ The other input to the operational amplifier 53 also connects via resistor $R_{21}$ with the capacitor $C_5$ and resistor $R_{22}$ connected in feed-back relation with the output of the operational amplifier 53. The output of the operational amplifier 53 connects with resistor $R_{24}$, and the junction of resistors $R_{24}$, $R_{23}$ connect with the base of a switching transistor $Q_1$, which is emitter-connected to ground. The collector of the transistor $Q_1$ connects to voltage supply (Vdd) through the coil $L_1$ of the associated relay (not shown) and diode $D_4$ to provide bias to the transistor $Q_1$ and operate the relay to interrupt the protected circuit upon occurrence of a true earth leakage condition.

The timing circuit 16 allows selectivity between associated protected equipment and is controlled by a time constant $(RC)_2$ defined by the resistance of the variable resistor $R_{18}$, and the capacitance of the capacitor $C_4$, from zero time delay for immediate trip occurrence, to a delay of several seconds. The resistor $R_{19}$ and diode $D_3$ provide a fast discharge path for capacitor $C_4$ when the earth leakage condition disappears as well as when the control power is turned off. When a logical "1" is inputted to the variable resistor $R_{18}$, the capacitor $C_4$ begins accumulating a voltage charge. Once the capacitor voltage reaches the threshold set by the Zener diode $Z_1$, the output of the operational amplifier 53 turns on and biases the switching transistor $Q_1$ into conduction. The transistor in turn provides current to the input coil $L_1$ of the associated electromechanical output relay causing the relay to trip. Capacitor $C_5$ and resistor $R_{22}$ provide a time delay to the switching transistor $Q_1$ for electromagnetic noise immunity.

Figure 7:
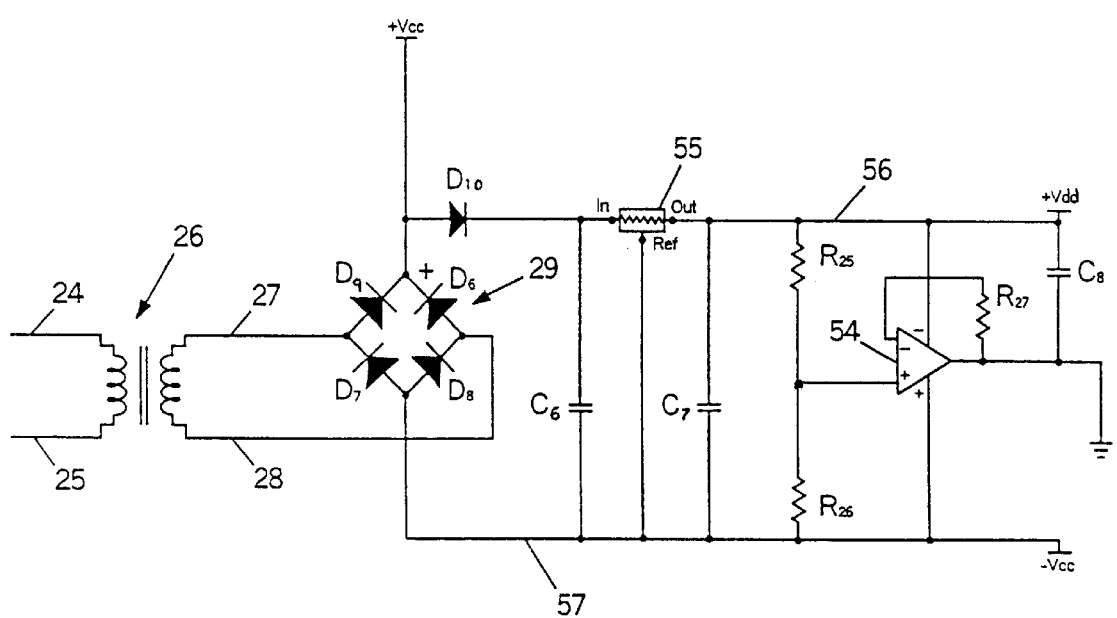
FIG. 7 is a diagrammatic representation of the power supply circuit within the earth fault relay of FIG. 1.

Operating power to the earth leakage circuit detection circuit 10 is supplied by means of the power supply circuit 18 shown earlier in FIG. 1 and depicted in detail in FIG. 7. As described earlier, the input terminals 24, 25 to the step down potential transformer 26 provide operating voltage to the full wave rectifier 29 over conductors 27, 28. The full wave rectifier 29 connects between the positive and negative rails 56, 57 and includes Diodes $D_6$–$D_9$ to provide rectified voltage which is connected with diode $D_{10}$ and a pair of parallel capacitors $C_6$, $C_7$ and is stabilized within a commercial integrated circuit 55. To provide a symmetrical voltage signal, integrated circuit 55 connects with one input to an operational amplifier 54 through a voltage divider consisting of resistors $R_{25}$ and $R_{26}$ both having the same value. The output of the operational amplifier 54 connects with the other input through the feedback resistor $R_{27}$ and defines a virtual ground of sufficient low impedance to provide a ground return path. The capacitor $C_8$, connected between the positive rail 56 and ground, provides a further low impedance path for transient signals to further improve electromagnetic noise immunity.

An earth leakage protection relay has herein been disclosed having excellent noise immunity facility to allow true earth leakage protection without incurring nuisance tripping due to harmonic noise signals generated within the protected electrical distribution system.

Although the present invention has been described with reference to certain embodiments, it will be appreciated that these embodiments are not imitations and that the scope of the invention is defined by the following claims.

We claim:

1. A control circuit for an earth leakage relay comprising:

a detection circuit for monitoring earth leakage current within an electrical system;

a filter circuit for attenuating multiples of a frequency of a circuit current; and a comparator circuit for comparing a signal representative of said earth leakage current with a threshold value and outputting a control signal to an electric relay to interrupt said circuit current when said signal exceeds said threshold value.

2. The control circuit of claim 1 wherein said detection circuit comprises a current transformer.

3. The control circuit of claim 1 wherein said filter circuit comprises RC circuits connecting with an operational amplifier.

4. The control circuit of claim 3 wherein said RC circuits provide a damping factor value greater than 0.3 and less than 0.7 and a cut-off frequency ranging between 70 Hertz and 90 Hertz.

5. The control circuit of claim 1 further including a rectifier circuit connecting with said filter circuit, said rectifier circuit comprising a pair of first and second operational amplifiers having a common input connection and having first and second outputs interconnected through a pair of voltage divider resistors.

6. The control circuit of claim 1 wherein said comparator circuit comprises an operational amplifier having one input connecting with said filter circuit and a second input connecting with a comparator potentiometer, whereby said comparator potentiometer provides said threshold value.

7. The control circuit of claim 1 further including a timing circuit connecting with said comparator circuit, said timing circuit including an operational amplifier having an input connecting with a timing potentiometer and an output connecting with said electric relay through a switching transistor, whereby said timing potentiometer provides a predetermined time delay to said operational amplifier before turning on said operational amplifier and said switching transistor to activate said electric relay and interrupt said circuit current.

8. The control circuit of claim 2 wherein said detection circuit further includes a burden resistor connecting with said transformer for providing said signal representative of said earth leakage current.

9. The control circuit of claim 1 wherein said filter circuit comprises a low pass second order filter.

10. The control circuit of claim 9 wherein said filter circuit has a gain defined by formula $$G(f) =$$

$$\frac{1}{R3 \cdot R5} \cdot \frac{1}{-(2\pi f)^2 \cdot C1 \cdot C2 + C2\left(\frac{1}{R3} + \frac{1}{R5} + \frac{1}{R6}\right) \cdot j \cdot 2\pi f + \frac{1}{R5 \cdot R6}}$$

where,

G is said gain, f is said frequency,

C1 and C2 are values of capacitors within said filter circuit, and

R3, R5 and R6 are values of resistors within said filter circuit.

11. The control circuit of claim 10 wherein said filter circuit has a direct current gain defined by formula G(O)= R6/R3.

12. A method for determining earth leakage current within a protected electrical circuit comprising:

detecting said earth leakage current;

filtering a signal representative of said earth leakage current;

comparing said signal representative of said earth leakage current with a threshold value; and actuating a protective relay when said earth leakage current exceeds said threshold value to interrupt said current.

13. The method of claim 12 wherein said filtering further includes filtering with a low pass second order filter circuit.

14. The method of claim 12 wherein said detecting further includes using a transformer to provide said signal representative of said earth leakage current.

15. The method of claim 12 further comprising rectifying said signal representative of said earth leakage current.

16. The method of claim 12 further comprising actuating said protective relay when said earth leakage current exists for a period of time greater than a predetermined period of time.

17. The method of claim 13 wherein said filter circuit has a gain defined by formula $$G(f) =$$

$$\frac{1}{R3 \cdot R5} \cdot \frac{1}{-(2\pi f)^2 \cdot C1 \cdot C2 + C2\left(\frac{1}{R3} + \frac{1}{R5} + \frac{1}{R6}\right) \cdot j \cdot 2\pi f + \frac{1}{R5 \cdot R6}}$$

where,

G is said gain, f is said frequency,

C1 and C2 are values of capacitors within said filter circuit, and

R3, R5 and R6 are values of resistors within said filter circuit.

* * * * *